United States Patent [19]
Smith et al.

[11] Patent Number: 5,117,440
[45] Date of Patent: May 26, 1992

[54] DIGITAL QUADRATURE PHASE DETECTION

[75] Inventors: James A. Smith; John A. Johnson, both of Idaho Falls, Id.

[73] Assignee: The United States of America as represented by the United States Department of Energy, Washington, D.C.

[21] Appl. No.: 395,124

[22] Filed: Aug. 17, 1989

[51] Int. Cl.$^5$ ............................................. H04L 27/14
[52] U.S. Cl. ...................................... 375/82; 329/327; 329/304; 359/191
[58] Field of Search ...................... 375/39, 44, 118, 80, 375/82, 85, 119; 329/327, 323, 304, 306; 356/349; 328/133; 455/615

[56] References Cited

U.S. PATENT DOCUMENTS

| | | | |
|---|---|---|---|
| 4,038,540 | 7/1977 | Roberts | 375/95 X |
| 4,057,759 | 11/1977 | Genova et al. | 375/85 |
| 4,146,841 | 3/1979 | McRae | 375/84 |
| 4,683,578 | 7/1987 | Betts et al. | 375/39 X |
| 4,689,804 | 8/1987 | Srinivasagopalan et al. | 375/118 X |
| 4,910,465 | 3/1990 | Dillman | 328/133 |

OTHER PUBLICATIONS

Smith et al. "Fiber Optic Sensing for NDE and Process Control", Society for Experimental Mechanics, Inc., 1989 pp. 788-793.

Primary Examiner—Benedict V. Safourek
Assistant Examiner—Tesfaldet Bocure
Attorney, Agent, or Firm—Bradley W. Smith; John M. Albrecht; William R. Moser

[57] ABSTRACT

A system for detecting the phase of a frequency of phase modulated signal that includes digital quadrature sampling of the frequency or phase modulated signal at two times that are one quarter of a cycle of a reference signal apart, determination of the arctangent of the ratio of a first sampling of the frequency or phase modulated signal to the second sampling of the frequency or phase modulated signal, and a determination of quadrant in which the phase determination is increased by $2\pi$ when the quadrant changes from the first quadrant to the fourth quadrant and decreased by $2\pi$ when the quadrant changes from the fourth quadrant to the first quadrant whereby the absolute phase of the frequency or phase modulated signal can be determined using an arbitrary reference convention.

7 Claims, 6 Drawing Sheets

DIGITAL QUADRATURE PHASE DETECTION

CONTRACTUAL ORIGIN OF THE INVENTION

The United States Government has rights in this invention pursuant to Contract No. DE-AC07-76ID01570 between the United States Department of Energy and EG&G Idaho, Inc.

BACKGROUND OF THE INVENTION

The present invention is related to phase detection of a signal. The determination of phase of a signal and determination of phase shift of a signal are basic processes having numerous applications. Examples include communications, FM discriminators, heterodyne interferometry, astronomy, and scientific research.

A specific application for which the present invention may be used is heterodyne interferometry. Heterodyne interferometry can be used for nondestructive evaluation (NDE) of materials. Heterodyne interferometry has been used for vibration measurement of the thermal protection tiles on the space shuttle orbiter. As used for such measurements, this technique has been conducted under specially controlled laboratory conditions. Heterodyne interferometry or other NDE techniques (optical, vibrational or sonic) could be developed for the inspection of completed parts and the sensing of manufacturing processes for feedback control of those processes. However, such techniques, as currently employed, require delicate alignment and calibration which make them impractical outside of the laboratory. It would make such techniques usable for a wide variety of industrial applications if a means were provided that made such techniques less delicate and more reliable under normal manufacturing conditions. It is for such an objective that the present invention provides an economical and reliable means for phase determination measurements.

Accordingly, it is an object of this invention to provide a means for phase detection of a signal.

It is a further object of this invention to provide a means for phase detection that can be implemented economically.

It is another object of this invention to provide a method and apparatus for phase detection that can make certain processes like heterodyne interferometry inspection adaptable to a wide variety of usages.

It is yet another object of this invention to provide a means for phase detection that can be applied to a various applications such as communications, FM discriminators, heterodyne interferometry, astronomy, and scientific research.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objectives and in accordance with the purposes of the present invention, as embodied and broadly described herein, the system and method of the present invention provide for detecting the phase of a frequency or phase modulated signal. The present invention includes digital quadrature sampling of the frequency or phase modulated signal at two times that are one quarter of a cycle of a reference signal apart, determination of the arctangent of the ratio of a first sampling of the frequency or phase modulated signal to the second sampling of the frequency or phase modulated signal, and a determination of quadrant transitions by which the phase is increased by $2\pi$ when the quadrant changes from the fourth quadrant to the first quadrant and decreased by $2\pi$ when the quadrant changes from the first quadrant to the fourth quadrant according to an arbitrary reference convention whereby the total absolute phase of the frequency or phase modulated signal can be determined.

DETAILED DESCRIPTION OF THE INVENTION

Figure 1:
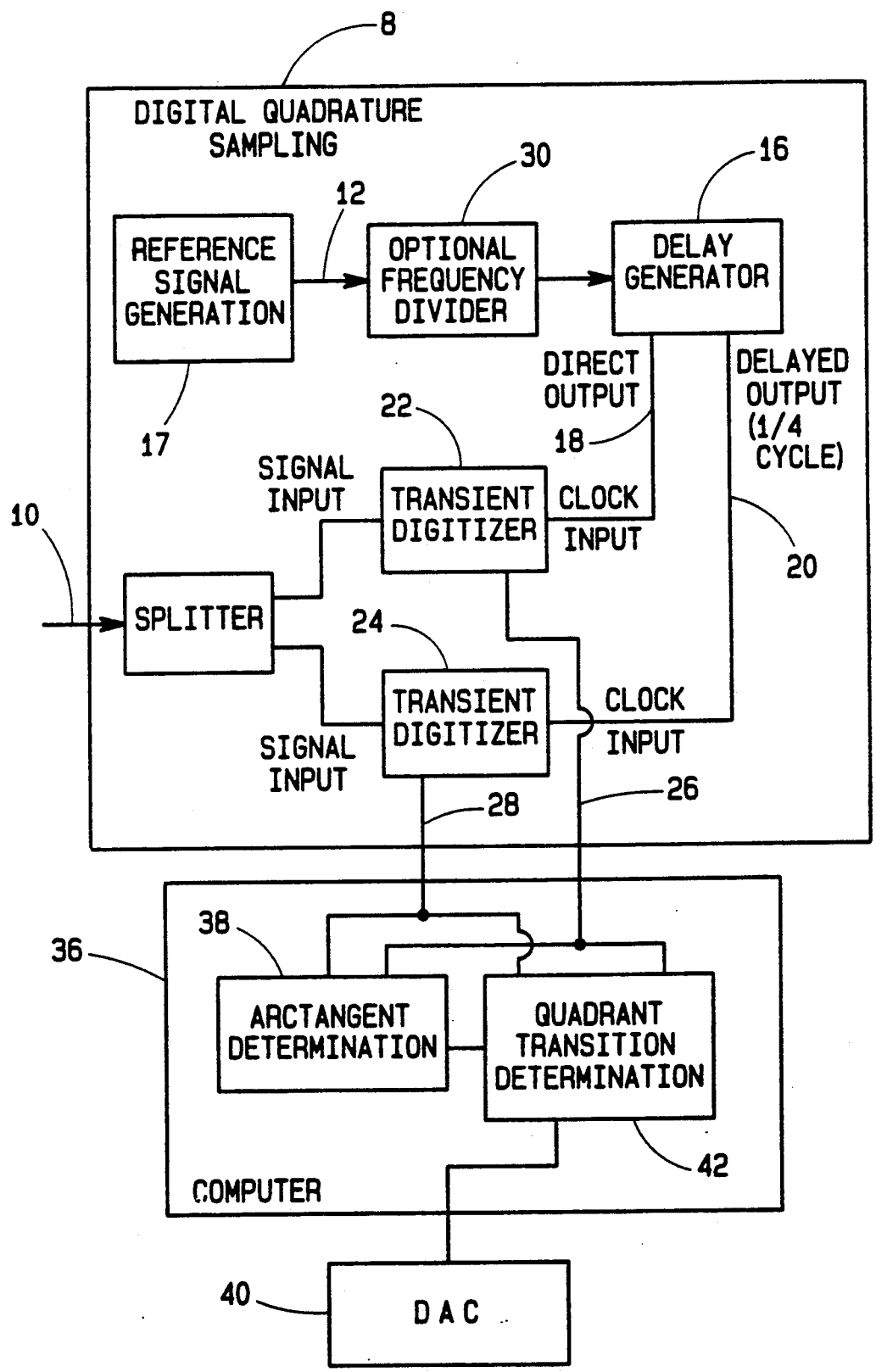
FIG. 1 is a diagram of the present invention.

FIG. 1 depicts a flow diagram of the present invention. A test signal 10 is a frequency or phase modulated signal. The detection of the phase of test signal 10 is the purpose of the present invention. A digital quadrature sampling means 8 samples test signal 10 in quadrature, as explained below. A reference (or unmodulated) carrier signal 12 is sent to a delay generator 16. The reference signal 12 may be independently provided by a reference signal generating means 17 or may be extracted from a signal used to generate the signal that becomes the test signal 10. The delay generator 16 provides two output signals 18 and 20 which differ in phase by ¼ cycle with respect to the reference signal. Output signal 18 is a direct output and output signal 20 is delayed by ¼ cycle. Output signals 18 and 20 are used as clocks for first digitizer 22 and second digitizer 24, respectively. First digitizer 22 and second digitizer 24 sample and acquire data from the test signal 10 at times that are ¼ of a cycle of the reference signal 12 apart. Frequency or phase modulated signal 10 can be characterized by digitizing at the radio-frequency (RF) carrier signal 12 and at one quarter of a cycle (of the carrier frequency 12) apart. The phase of the signal 10 during that cycle is the arctangent of the ratio of the digitized values. This phase can be sampled in quadrature as often as desired up to the frequency of the carrier signal.

In this embodiment, the phase is determined once every cycle of the unmodulated RF reference signal 12. It is also possible to divide the reference signal 12 down to lower frequency (which would be some submultiple of the reference signal 12) by means of a frequency divider 30 that divides reference signal 12 before it is sent to the delay generator 16. For example, if the reference frequency were divided by 100, then the modulated signal 10 would be sampled in quadrature only on every 100th cycle.

The first digitizer 22 provides output 26 and second digitizer 24 provides output 28. The ratio of each pair of digitized values (i.e., output 26 divided by output 28) is the tangent of the phase of the modulated RF test signal 10. This is shown as follows.

The phase at the time that the first digitizer 22 samples the modulated signal 10 is $\phi$. The digitized value 26 is proportional to the sine of $\phi$ with the amplitude of the carrier signal being the constant of proportionality:

$$D_1 = A \sin \phi$$

The second digitizer 24 has a value which is shifted by $\frac{1}{4}$ of a cycle:

$$D_2 = A \sin(\phi + \pi/2) = A \cos \phi$$

Thus the ratio of the values is the tangent of the phase, independent of the amplitude of the modulated signal 10 (so long as that amplitude does not vary appreciably during the $\frac{1}{4}$ cycle between the two samples).

Output 26 from first digitizer 22 and output 28 from second digitizer 24 are sent to computer 36. The phase can be recovered using computer 36 to read the digitized data from the digitizers and calculating the arctangent with a means for determining the arctangent 38. The arctangent can be calculated with software or by using a digital hardware division circuit (e.g. a ROM look-up table containing the arctangent values). A digital-to-analog convertor 40 may be provided to produce an analog phase signal which may be required in some applications such as audio communications.

At this point, the phase is determined within the range from 0 to $2\pi$ radians Due to repetitive sampling brought on by sampling at a specified frequency, it may be necessary to track phase changes greater than $2\pi$, radians resulting in a total phase angle of $2\pi n + \phi$ where $\phi$ is the phase angle calculated by the arctangent function as described earlier and n, an integer, reflected the algebraic number of times the phase of the modulated signal crosses the origin in moving from the fourth quadrant to the first quadrant and reciprocally. Therefore a means must be provided to keep track of the quadrant of the phase angle and decrease the total phase angle by $2\pi$ when the quadrant occupied by the phase angle changes from the first to the fourth and increase the total phase angle by $2\pi$ when the quadrant occupied by the phase angle changes from the fourth to the first according to an arbitrary reference convention. Quadrant transition determination means 42 is provided to keep track of phase motion greater than $2\pi$ radians. Quadrant transition determination means 42 can be a program implemented on computer 36. If $D_1 \geq 0$ and $D_2 \geq 0$, then the phase angle, $\phi$, is in the first quadrant. If $D_1 < 0$ and $D_2 \geq 0$, then $\phi$ is in the fourth quadrant. Since the transition from the, fourth quadrant to the first quadrant is an increase of the total phase angle by phase $2\pi$, and the transition from the first quadrant to the fourth quadrant is a decrease of the total phase angle by phase of $2\pi$, the quadrant transition determination means 42 needs to keep track of these transitions and add or subtract $2\pi$ to the total phase angle $\phi$ to completely track phase motion greater than $2\pi$ radians.

Figure 2:
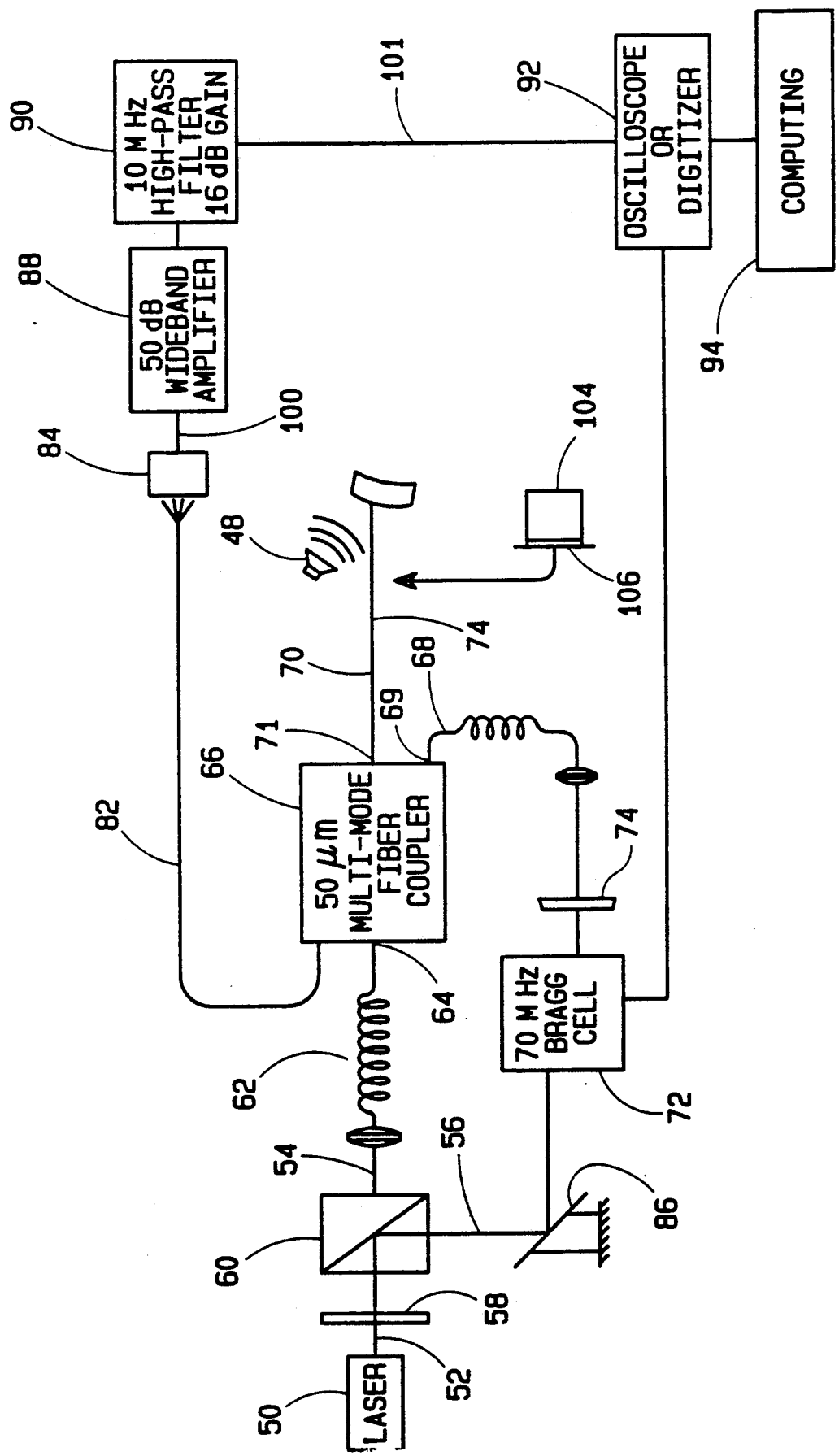
FIG. 2 is a diagram of the present invention as used with an ultrasonic vibrational inspection system.

As mentioned above, the present invention has various applications. One application is depicted in FIG. 2. FIG. 2 shows the present invention applied to an ultrasonic (or vibrational) inspection system. Depending on the application either an optically generated ultrasonic energy delivery system or a mechanically generated acoustic delivery system will be used to inspect the test structure. For economy and for ease of use, it is highly desirable to have one optical technique with the dynamic range and sensitivity to be able to sense both vibrations and ultrasound The sensing of motion in nondestructive evaluation (NDE) is usually broken up into two broad categories: vibration and ultrasound. Due to the large dynamic range differences in both frequency and displacement, separate sensors are usually used to monitor vibrations and ultrasound. However, with a slight modification to the Laser Doppler Velocimetry (LDV) technique, a single sensor has the dynamic range to monitor vibrations and ultrasound. To understand how this LDV technique works, a brief review of LDV will be given.

The main principle which makes LDV so useful as a motion sensor is the coherent interference of two beams of light which have slightly different frequencies given by this equation $$E(t) = E_{01}\sin(wt + \phi_1) + E_{02}\sin\left[(w + \Delta w)t + 2\pi\left(\frac{\Delta}{\lambda} + m\right) + \phi_2\right]$$

where E(t) is the total electric field, $E_{01}$ is the electric field for the reference beam, $E_{02}$ is the electric field for the object beam, w is the frequency of light used, t is time, $\Delta w$ is change in frequency, $\lambda$ is the wavelength of light, $\Delta$ is the path length of the light, m is an arbitrary integer, and $\phi_{1,2}$ are arbitrary phases. If it is assumed that the arbitrary phase terms cancel, the light intensity at the photo diode is given by $$E^2(t) = (E_{01})^2 + (E_{02})^2 + E_{01}E_{02}\left[\sin\left(\Delta wt + 2\pi\frac{\Delta}{\lambda}\right)\right]$$

Notice that the equation for light intensity contains the beat frequency, $\Delta wt$, and a phase term, $2\pi\Delta/\lambda$. If the phase term is concentrated on by synchronizing the scope or the digitizer to the beat frequency, the signal is contained in the sliding of the sine term. It is very easy to see the light intensity signal slide across the scope. In order to determine the phase, the technique of the present invention, as described above can be employed.

As described above, if a sinusoid is sampled twice in synchronism with the frequency and not with the phase, and if the two points are sampled in quadrature (i.e., sampled one-fourth of a wavelength apart), the phase of the light intensity signal can be easily tracked by an intelligent data acquisition system. Since the sinusoid is being sampled in quadrature, this set of equations is valid:

$$S_1 = \sin \Theta_1$$

$$S_2 = \sin \Theta_2$$

$$\Theta_2 = \Theta_1 + \frac{\pi}{2}$$

This set of equations can be solved for $\Theta_1$:

$$\Theta_1 = \tan^{-1}\left(\frac{S_1}{S_2}\right).$$

This gives the absolute phase of the sinusoid to from 0 to $2\pi$ radians. To keep track of phase motion greater than $2\pi$ radians, intelligent programming is needed. If $S_1 \geq 0$ and $S_2 \geq 0$, then $\Theta_1$ is in the first quadrant. If $S_1 < 0$ and $S_2 \geq 0$, then $\Theta_1$ is in the fourth quadrant. Since the transition from the fourth quadrant to the first quadrant is an increase of the total phase angle by $2\pi$, and the transition from the first quadrant to the fourth quadrant is a decrease the total phase angle by of $2\pi$ due to an arbitrary reference convention, the intelligent program needs to keep track of these transitions and add or subtract $2\pi$ to the total phase angle to completely track phase motion greater than $2\pi$ radians.

The Nyquist criterion is no longer the limiting factor for aliasing errors when sampling in quadrature. The Nyquist criterion is replaced by a maximum velocity which produces the largest tolerable error. If the phase changes appreciably after the data point $S_1$ has been sampled, the relation $\Theta_1 + \pi/2 = \Theta_2$ is not longer valid.

The phase error caused by the velocity of the sample can be modeled by $$\phi_{err} = \tan^{-1}\left(\frac{S_1 + V_{err}}{S_2}\right)$$

The worst case in sensitivity to this error is when $S_1 \approx 1$ and when $S_2 \approx 0$. To keep the phase measurement to within the standard experimental error (5.0% or 18 degrees) $V_{err}$ must be less than 0.32 for a sinusoid with a normalized amplitude of 1. The 5.0% phase error corresponds to a displacement error, $D_{err}$, of 0.05 $\lambda_{laser}$. The maximum velocity that is then digitizable is dependent on $D_{err}$ and $F_{beat}$ as shown.

$$V_{max} = D_{err} F_{beat} 4$$

The embodiment depicted in FIG. 2 is an interferometer designed to employ LDV for vibrational sensing. An application for which this embodiment may be used is to test the stability of tiles on the space shuttle orbiter. A tile 46 is caused to vibrate by acoustic speaker 48. A 5 mW stabilized laser 50 is used to provide the light source, laser beam 52. Half wave plate 58 and polarizing beam splitter 60 split laser beam 52 into two beams 54 and 56. This allows the light intensity in each leg of the interferometer to be optimized for maximum signal. Beam 54 travels along the specimen leg 62 of the interferometer and is focused into one leg 64 of the 50 μm core diameter multimode fiber coupler 66. Beam 54 is then split into two beams 68 and 70 of nearly equal intensity. Beam 68 exits out of one leg 69 of the coupler 66 toward the Bragg cell 72 and is mostly blocked by aperture 74. The other beam 70 exists out of the other coupler leg 71 via fiber 74 and is directed onto tile 46. Some of beam 70 is reflected back down fiber 74 back into coupler 66. In the coupler 66, this reflected beam is split into two beams again by the fiber coupler 66 with one of the beams exiting back toward the polarizing beam splitter 60. The other beam 82 exits out onto the photodiode detector 84.

Referring back to the polarizing beam splitter 60, the other output of the splitter 60 is reference beam 56. Reference beam 56 is reflected by mirror 86 into the Bragg cell 72 and frequency shifted. Reference beam 56 is operated on by the fiber coupler 66 in an analogous manner as the signal beam 54 except that reference beam 56 is used after the first splitting in the coupler 66. The signal beam 82 mixes with the reference beam 56 in the coupler. The Bragg frequency shift is then detected at the photodiode 84 as a Doppler signal at 70 Mhz. This Doppler signal 100 (the combination of 82 and 56) is then amplified by 50 dB amplifier 88 and passed to a 10 Mhz high pass filter 90 which adds another 16 dB of gain. The output 101 of filter 90 is then sent to the oscilloscope or digitizing system 92. Digitizing system 92 samples in synchronism with the Bragg shift frequency as explained earlier. Thus, phase of the Doppler signal can be monitored. Digitizing system 92 provides an output to computer means 94. Computer means 94 is used to store the data from the digitizing system 92. Computer means 94 can also be used to implement the digital quadrature phase detection as explained in reference to FIG. 1 (i.e. the arctangent determination and the quadrant transition determination).

(It may also be necessary to provide calibration of the interferometry system. This can be accomplished by substitution of a transducer 104 and mirror 106 for the tile 46 and transmitting a known signal back into coupler 66 from the transducer 104).

In an experimental example of the arrangement described in FIG. 2, the use of the multimode fiber did not contribute significantly to noise in the system. The fact that a stabilized HeNe laser was used kept the different modes coherent and able to interfere with one another in the fiber coupler. The major source of noise in the system was due to the Fresnel reflections at the fiber tip ends. The Fresnel reflection from the fiber tip can be used to detect ultrasound, but in this case a mirror was used to overwhelm the noise signal caused by the Fresnel reflections. These unwanted reflections can be minimized by placing an anti-reflection coating on the ends of the fiber tips. Since there was a lot of stray light directed back toward the laser possibly setting up another resonance in the laser cavity, a beat signal of 381 kHz was observed riding on top of the 70 MHz beat frequency. This signal was in synchronism with the 70 MHz signal because it was observed to slide back and forth across the scope just like the 70 MHz Doppler signal. This phenomenon was considered noise and filtered out using the 10 MHz high pass filter and amplifier.

The absolute phase stability of the system was never constant mostly due to the multimode fiber coupler. This did not seem to affect the signal since motion at low frequency (10–100 Hz) was clearly detected. Multimode fiber should probably not be used for absolute displacement since the phase of the beat signal drifts, however, it works well for relative displacements.

Figure 3:
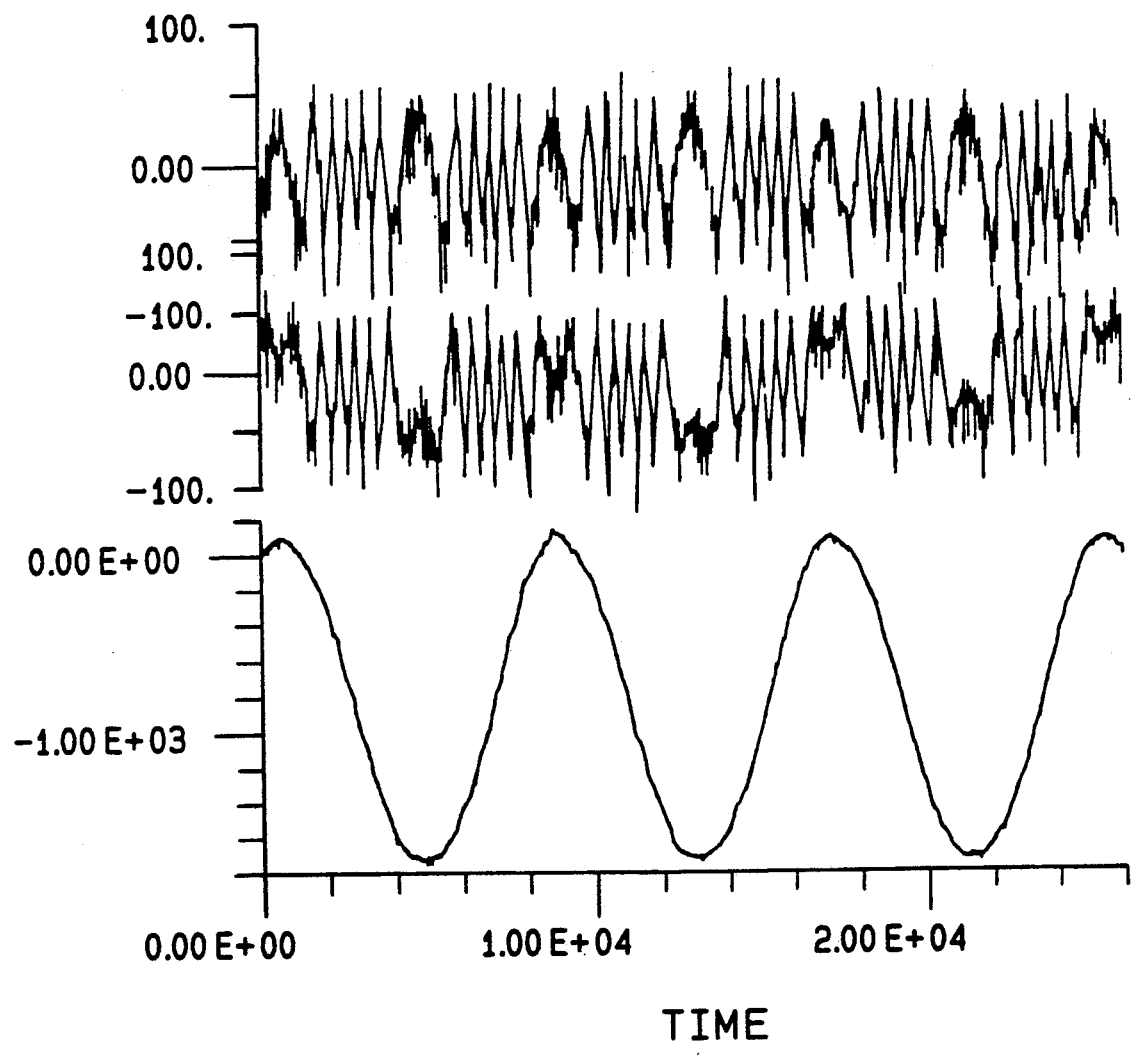
FIG. 3 is a graph of the data, S1 and S2 (top two traces), and the processed data (bottom trace).

FIG. 3 shows the raw data $S_1$ and $S_2$, top two traces, for a sinusoidal excitation of 100 Hz. The processed displacement information from the top two traces is shown in the bottom trace. The total movement of the piezoelectric transducer is close to three wavelengths. Notice how the raw frequency increases when the transducers velocity is high and the raw frequency decreases when the transducers velocity is slow at the peaks.

Figure 4:
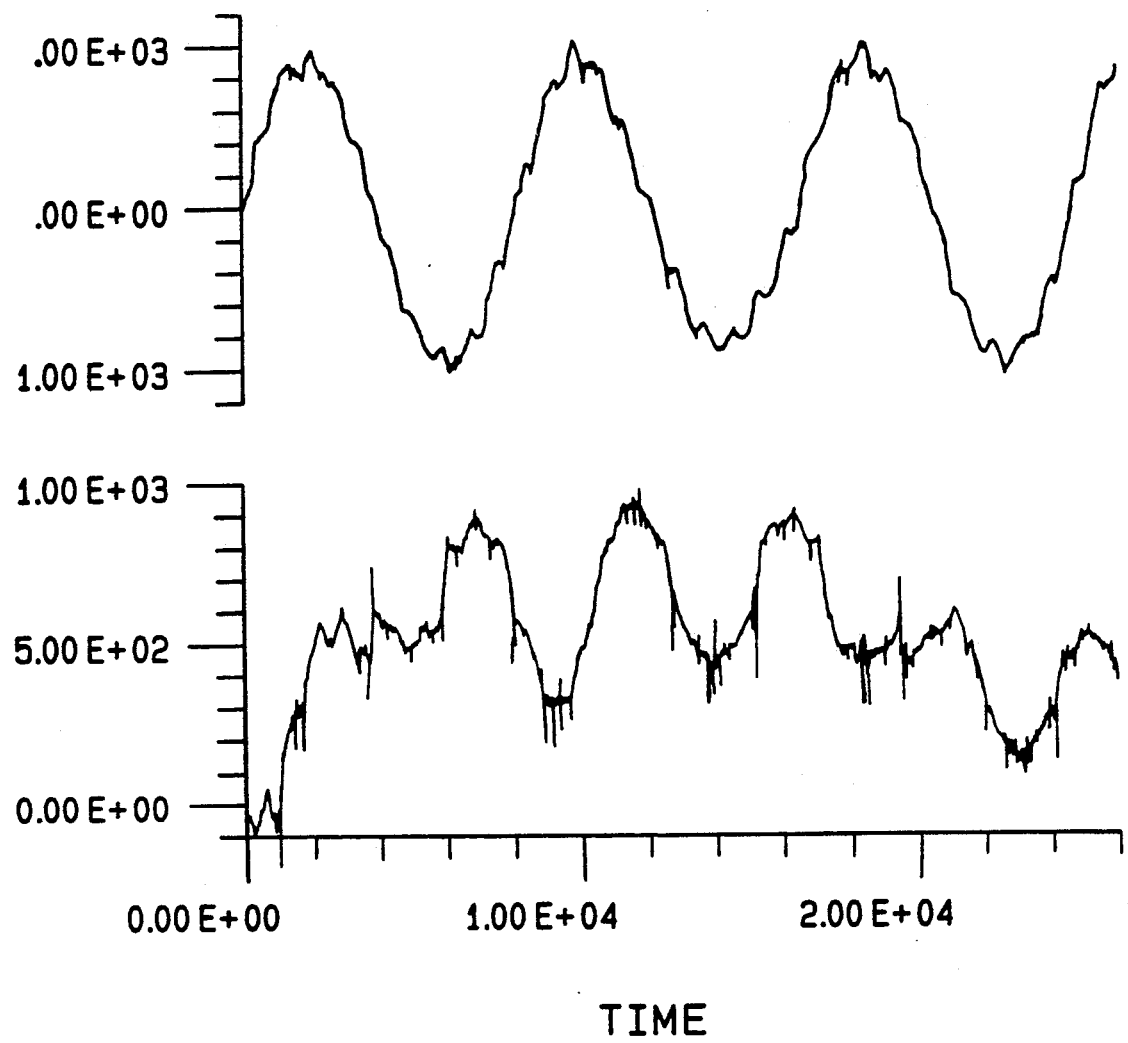
FIG. 4 is a graph of a large amplitude (top) and a small amplitude (bottom) excitation.

FIG. 4 shows 100 Hz signals. The top graph shows a high amplitude ($\approx 3\ \lambda$) excitation of the piezo transducer and the bottom graph shows the result with a low amplitude ($\approx 1 \lambda$) excitation.

Figure 5:
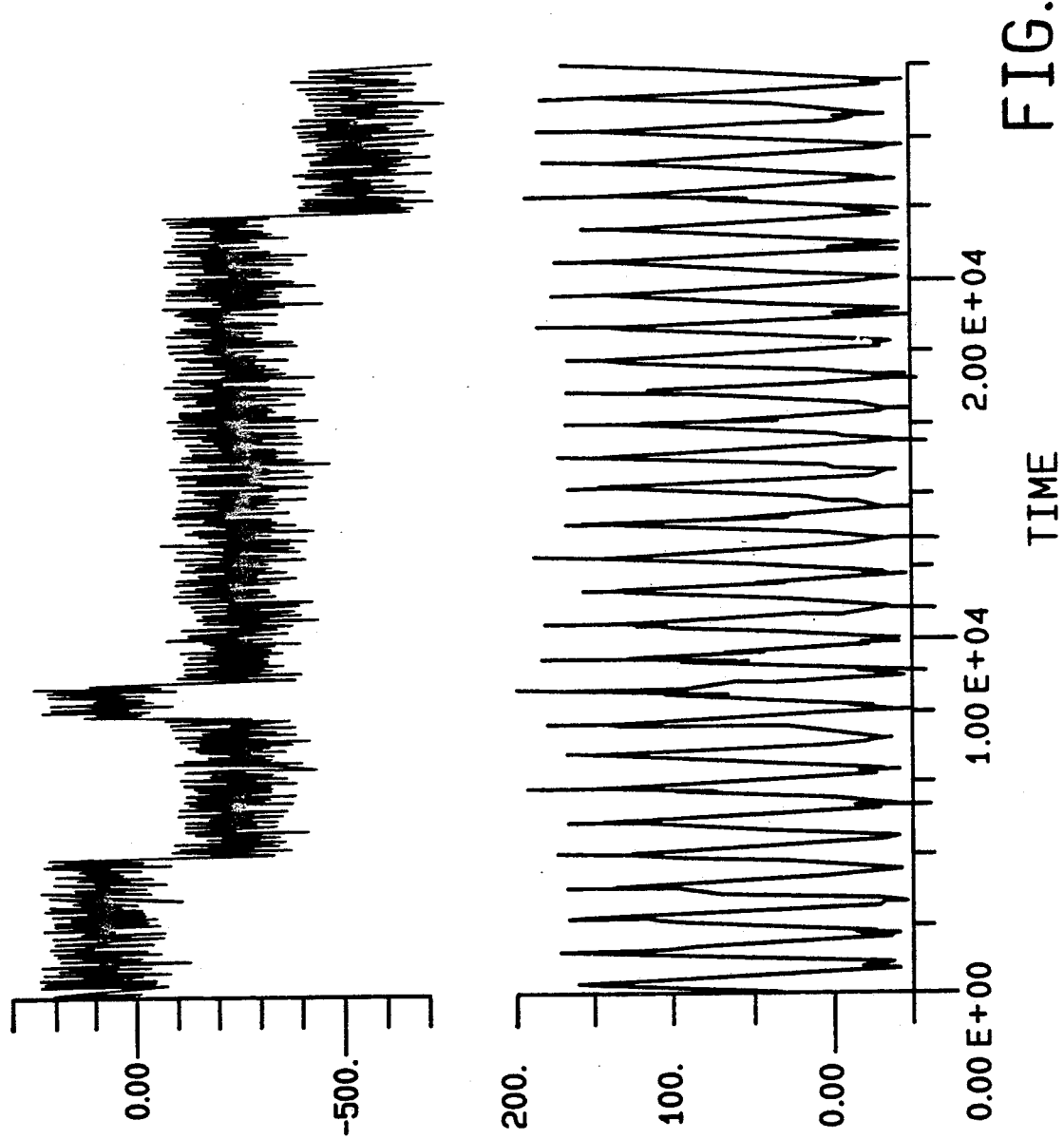
FIG. 5 is a graph of an example of $2\pi$ aliasing (top) and a plot of the correctly sampled wave format (bottom).

FIG. 5 (top) is an example of $2\pi$ aliasing at 10 kHz. When the noise level is too great or when the velocity of the specimen is too fast for the digitization rate or a combination of the two, the intelligent program becomes confused. The program adds or subtracts $2\pi$ when it should not. Notice that the excitation signal is still in the data, just discontinuously displaced in a few places. The bottom trace in FIG. 5 is the same signal that is digitized at a faster rate which removes the $2\pi$ aliasing.

Figure 6:
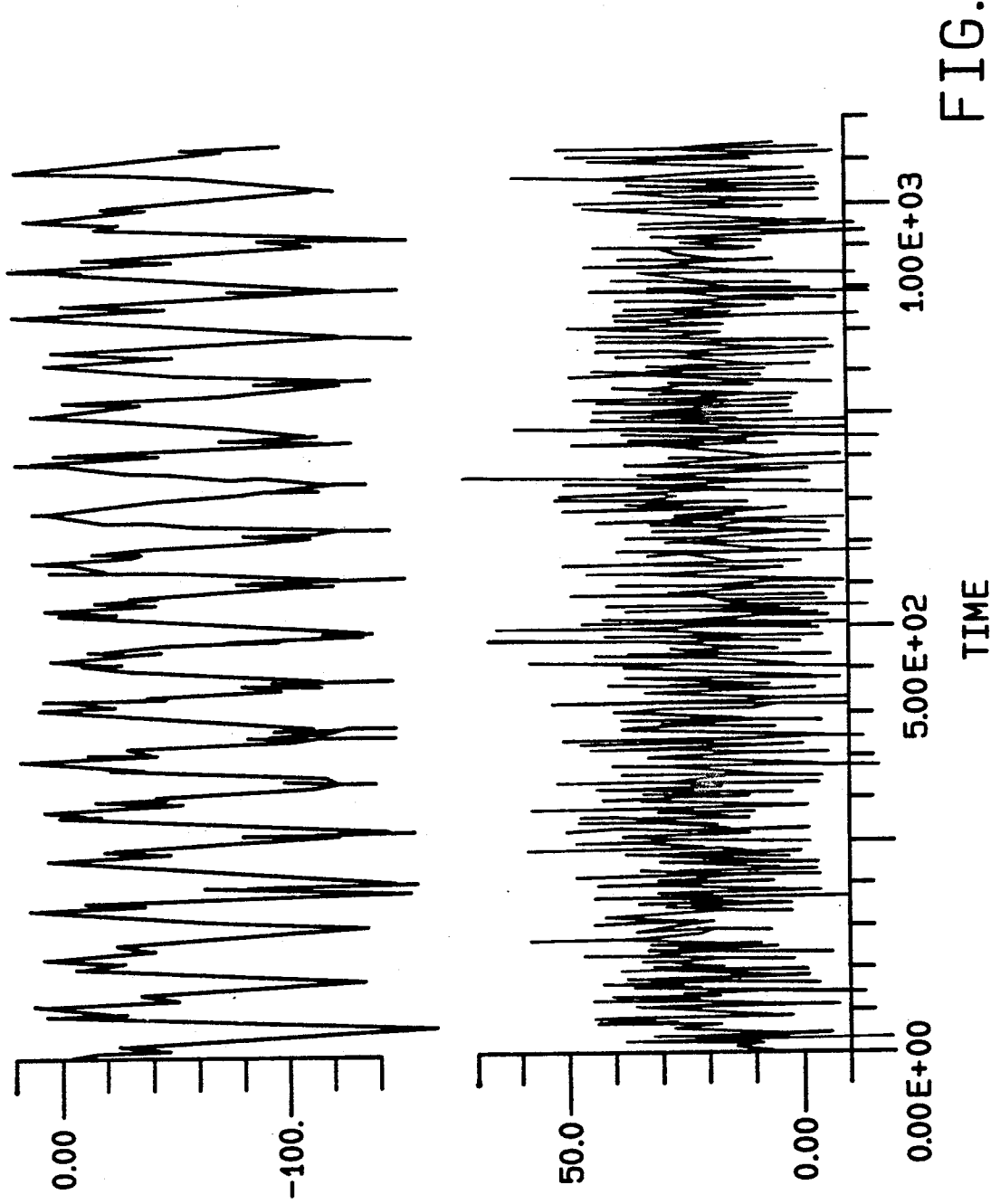
FIG. 6 is a plot of displacement at 17 KHz (top) and a plot of noise (bottom).

FIG. 6, top, shows an excitation signal at 17 kHz. The bottom trace shows an expanded time series the sensor received when there is not excitation or it shows the noise in the system. Notice that the noise has an average value near 50 nm, but the excitation signals detected have much less noise in them. Thus, the induced signal effectively lowers the amount of noise in the system.

The use of the heterodyne technique has a number of advantages over conventional interferometry. The greatest advantage is that the heterodyne technique has the potential to be self-aligning. When the beat frequency is at a maximum amplitude, the optical system is aligned. Another big advantage is that the sense of the motion can be determined because the absolute phase of the signal is known by implementing Phase Detection using Quadrature. Since the beat signal gives the maximum amplitude of the signal, partial fringe orders can be very accurately determined, and if the beat frequency is sampled in quadrature, only the amplitude of a quarter cycle needs to remain constant. The Doppler technique has many advantages to standard interferometry and yet still maintains the resolution and surpasses the dynamic range of standard interferometry. When the heterodyne system is combined with fiber optics and phase detection using quadrature, it potentially has the resolution and the dynamic range to sense both ultrasound and vibrations while in the field.

The embodiments of the invention in which an exclusive property or privilege is claimed are defined as follows:

1. An apparatus for detecting the phase of a frequency or phase modulated signal having a carrier signal comprising:
   reference signal generating means for providing a reference signal at a specified frequency,
   frequency divider means coupled to said reference signal generating means for diving the frequency of said reference signal by an appropriate integer to produce an adjusted reference signal,
   delay generator means for splitting said adjusted reference signal into a first reference signal and a second reference signal and for delaying said second reference signal by one quarter of an adjusted reference signal cycle where said delay generator means is coupled to said frequency divider means,
   digitizer means for obtaining and transmitting a digitized composite sample signal which reflects a composite sample of the modulated signal at a sampling rate governed by the frequency of said adjusted reference signal and where said composite sample of the modulated signal comprises a first digitizer sample signal of the modulated signal and a second digitized sample signal of the modulated signal acquired one quarter of the adjusted reference signal cycle later where said digitizer means is responsive to said delay generator means and the modulated signal;
   arctangent determination means coupled to said digitizing means for using said first digitized sample signal and said second digitized sample signal to determined a phase quadrant,
   for determining a ratio of said first digitized sample signal to said second digitized sample signal where said ratio is formed by dividing said first digitized sample signal by said second digitized sample signal and
   for calculating an arctangent of said ratio where said phase quadrant and said arctangent combine to define the phase of the modulated signal with values ranging from 0 to $2\pi$ radians; and
   quadrant transition determination means for formulating a total phase determination which is representative of the phase outside of the 0 to $2\pi$ radians range and where said quadrant transition determination means is responsive to said digitizer means and said arctangent determination means where said quadrant transition determination means is capable of storing a value which represents the algebraic number of times the phase of the modulated signal transgresses a given origin in a given direction and increasing or decreasing said total phase determination by $2\pi$ radians depending on the direction of transgression, where said total phase determination is the sum of the phase of the modulated signal and $2\pi$ radians multiplied by said stored value where if the quadrant occupied by the phase of the modulated signal changes from the fourth quadrant to the first quadrant said total phase determination would increase by $2\pi$ radians and if the quadrant occupied by the phase of the modulated signal changes from the first quadrant to the fourth quadrant whereby said total phase determination would decrease by $2\pi$ radians.

2. The apparatus of claim 1 in which said reference signal generation means includes:
   a means for providing a reference signal linked to the modulated signal.

3. The apparatus of claim 2 in which said reference signal has the same frequency as the unmodulated carrier signal.

4. The apparatus of claim 1 in which said digitizer means includes:
   a first digitizer capable of sampling the modulated signal in response to an undelayed signal from said delay generator means and a second digitizer capable of sampling the modulated signal in response to a delayed signal from said delay generator means where said delayed signal is delayed by one quarter of an adjusted reference signal cycle.

5. The apparatus of claim 1 including computer means for calculating the phase and the total phase of the modulated signal where said computer means is responsive to said digitizing means and includes said arctangent determination means and said quadrant transition determination means and serves as an output for said phase and said total phase of the modulated signal.

6. The apparatus of claim 5 in which a digital to analog converter is responsive to said computer means and is capable of supplying an analog signal of the phase of the modulate signal.

7. A method for the measurement of the phase of a frequency-modulated or phase-modulated signal having a carrier signal comprising:

producing a reference signal linked to the modulated signal and having a frequency equal to that of the carrier signal, modifying the frequency of the reference signal by dividing the frequency of said reference signal by an integer number to produce an adjusted reference signal where said adjusted reference signal functions to reduce the sampling rate of the modulated signal; however, if no modification is desired, the reference signal passes unaltered so that the frequency of said reference signal is equal to the frequency of said reference signal resulting in the maximum sampling rate, using said adjusted reference signal as an input signal to said delay generator, splitting said input signal into a first signal and a second signal and delaying said second signal by one quarter of the wave length of said input signal, sampling the modulated signal in response to the first signal once each first signal cycle to attain a first sample, sampling the modulated signal in response to the second signal once each second signal cycle to attain a second sample, determining an arithmetic signal for both the first and second sample, using the arithmetic signs for both the first sample and the second sample to determine a quadrant for the phase, calculating a value for a ratio formed by dividing the first sample by the second sample, determining the arctangent of said ratio and using the quadrant of the phase to determine the phase of the modulated signal in the range of 0 to $2\pi$ radians, determining a total phase where said total phase depends on the number of times the phase has eclipse a given origin in either a positive or a negative direction, increasing the determination of said total phase by $2\pi$ radians if the quadrant changes from the fourth quadrant to the first, or decreasing the determination of said total phase by $2\pi$ radians if the quadrant changes from the first to the fourth quadrant.

* * * * *